US012726044B2

(12) United States Patent
Jenkins et al.

(10) Patent No.: US 12,726,044 B2
(45) Date of Patent: Sep. 1, 2026

(54) SUSTAINABLE POWER SHIFTING IN THE PRESENCE OF AN UNINTERRUPTIBLE POWER SUPPLY

(71) Applicant: International Business Machines Corporation, Armonk, NY (US)

(72) Inventors: Luke L. Jenkins, Poughkeepsie, NY (US); John S. Werner, Fishkill, NY (US); Arkadiy O. Tsfasman, Wappingers Falls, NY (US); John Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 18/529,728

(22) Filed: Dec. 5, 2023

(65) Prior Publication Data

US 2025/0183705 A1 Jun. 5, 2025

(51) Int. Cl.
*H02J 9/06* (2006.01)
*H02J 3/0012* (2026.01)
(Continued)

(52) U.S. Cl.
CPC ............ *H02J 9/068* (2020.01); *H02J 3/0012* (2020.01); *H02J 9/007* (2020.01); *H02J 9/062* (2013.01);
(Continued)

(58) Field of Classification Search
CPC .......... H02J 9/068; H02J 3/0012; H02J 9/007; H02J 9/062; H02J 13/12; H02J 13/14; H02J 13/333; H02J 2105/425
See application file for complete search history.

(56) References Cited

U.S. PATENT DOCUMENTS 7,130,202 B2 10/2006 Yang
9,660,484 B2 5/2017 Bergman
(Continued)

OTHER PUBLICATIONS

Caseiro et al.; "Cooperative And Dynamically Weighted Model Predicitve Control of a 3-Level Uninterruptible Power Supply with Improved Performance and Dynamic Response", Tie IEEE Transactions on, vol. 67, No. 6, pp. 4934-4945, Jun. 25, 2020.
(Continued)

*Primary Examiner* — Ziaul Karim
(74) *Attorney, Agent, or Firm* — Teddi Maranzano, Esq.; Rachel L. Pearlman, Esq.; Heslin Rothenberg Farley & Mesiti P.C.

(57) ABSTRACT

Disclosed embodiments provide methods, systems, and computer program products for implementing intelligent power shifting in an uninterruptable power supply (UPS) system for enhanced system efficiency. Disclosed embodiments implement intelligent power shifting to decrease UPS power consumption during normal system operation in the presence of a main power signal, increasing system efficiency, while providing redundancy in the absence or a disruption of the main power signal. Power shifting is based on an intelligent algorithm for controlling current through power supply units (PSUs) of the UPS system to shift a substantial portion of the main power signal through PSUs that are connected to power distribution units (PDU) not powered through the UPS, reducing power consumption by the UPS.

17 Claims, 6 Drawing Sheets

(51) Int. Cl.

| | |
|---|---|
| ***H02J 9/00*** | (2006.01) |
| ***H02J 13/12*** | (2026.01) |
| ***H02J 13/14*** | (2026.01) |
| ***H02J 13/333*** | (2026.01) |
| ***H02J 105/42*** | (2026.01) |

(52) U.S. Cl.

CPC .............. *H02J 13/12* (2026.01); *H02J 13/14* (2026.01); *H02J 13/333* (2026.01); *H02J 2105/425* (2026.01)

(56) References Cited

U.S. PATENT DOCUMENTS

| | | | | |
|---|---|---|---|---|
| 10,565,073 | B2 * | 2/2020 | Lee | G06F 1/30 |
| 11,146,103 | B1 * | 10/2021 | Davies | G06F 8/66 |
| 11,327,549 | B2 * | 5/2022 | Debata | G06F 1/30 |
| 11,411,509 | B2 | 8/2022 | Yu et al. | |
| 11,489,362 | B1 | 11/2022 | Luke et al. | |
| 11,616,388 | B1 * | 3/2023 | Chen | H02J 9/062 307/64 |
| 11,644,880 | B1 | 5/2023 | Thibodeau et al. | |
| 2009/0189774 | A1 * | 7/2009 | Brundridge | H02J 13/10 340/654 |
| 2011/0210710 | A1 * | 9/2011 | Yamamoto | H02M 3/156 323/282 |
| 2021/0006073 | A1 * | 1/2021 | Donahue | B60L 53/53 |
| 2022/0131408 | A1 * | 4/2022 | Chen | H02J 9/062 |
| 2022/0342473 | A1 | 10/2022 | Xiong | |
| 2023/0018342 | A1 * | 1/2023 | Lecuivre | G06F 9/4893 |
| 2023/0091202 | A1 * | 3/2023 | Mondal | H02M 7/4837 320/118 |

OTHER PUBLICATIONS

Dong et al.; "A Novel Control Strategy For Uninterruptible Power Supply Based on Backstepping and Fuzzy Neural Network", IEEE Access, vol. 11, pp. 5306-5313, Jan. 10, 2023.

Al-Hazemi et al.; "Dynamic Allocation of Power Delivery Paths in Consolidated Data Centers based on adaptive UPS Switching", Computer Networks, vol. 144, pp. 254-270, Oct. 24, 2018.

Chrysostomou et al.; "A Novel Machine Learning-Based Load-Adaptive Power Supply System for Improved Energy Efficiency in Datacenters", IEEE Access, vol. 9, pp. 161898-16108, Dec. 3, 2021.

Jinghang et al.; "Multi-Mode Operation For On-Line Uninterruptible Power Supply System", JESTPE IEEE Journal of, vol. 7, Issue 2, pp. 1181-1196, Jun. 2019.

* cited by examiner

SUSTAINABLE POWER SHIFTING IN THE PRESENCE OF AN UNINTERRUPTIBLE POWER SUPPLY

BACKGROUND

The present invention relates to an uninterruptable power supply system, and more specifically, to power shifting in an uninterruptable power supply (UPS) system.

In scenarios where a single main power feed is used for a datacenter, an UPS is often used to add utility redundancy in the event that the power feed is lost, where the system remains powered in N-mode through a battery backup of the UPS. Utilizing a UPS wastes unnecessary power, due to several stages of UPS conversion efficiency (e.g., typically in a range between 90~95% efficiency, dependent on load). For example, if a 16 kW system runs one of its redundant PDUs through a UPS for utility redundancy, significant power is consumed by the UPS, for example about 800 W of power is constantly lost in the UPS, during normal system operation without a utility outage.

SUMMARY

Embodiments of the present disclosure are directed to methods, systems, and computer program products for implementing intelligent power shifting in an uninterruptable power supply (UPS) system that includes redundant Power Distribution Units (PDUs) distributing power to associated power supply units (PSUs) to provide enhanced system efficiency.

According to one embodiment of the present disclosure, a non-limiting computer implemented method is provided. The method comprises providing an uninterruptable power supply (UPS) to use for a load; determining a first subset of power supply units (PSUs) that are coupled to a first Power Distribution Unit (PDU) powered through the UPS and a second subset of PSUs that are coupled to a second PDU not powered through the UPS; and conditioned upon a presence of a main power signal, shifting a predefined amount of the main power signal to the second subset of PSUs coupled to the second PDU not powered by the UPS.

According to one embodiment of the present disclosure, a system is provided. The system includes one or more computer processors, and a memory containing a program which when executed by the one or more computer processors performs an operation. The operation comprises providing an uninterruptable power supply (UPS) to use for a load; determining a first subset of power supply units (PSUs) that are coupled to a first Power Distribution Unit (PDU) powered through the UPS and a second subset of PSUs that are coupled to a second PDU not powered through the UPS; and conditioned upon a presence of a main power signal, shifting a predefined amount of the main power signal to the second subset of PSUs coupled to the second PDU not powered by the UPS.

According to one embodiment of the present disclosure, a computer program product is provided. The computer program product includes a computer-readable storage medium having computer-readable program code embodied therewith, the computer-readable program code executable by one or more computer processors to perform an operation. The operation comprises providing an uninterruptable power supply (UPS) to use for a load; determining a first subset of power supply units (PSUs) that are coupled to a first Power Distribution Unit (PDU) powered through the UPS and a second subset of PSUs that are coupled to a second PDU not powered through the UPS; and conditioned upon a presence of a main power signal, shifting a predefined amount of the main power signal to the second subset of PSUs coupled to the second PDU not powered by the UPS.

DETAILED DESCRIPTION

Figure 1:
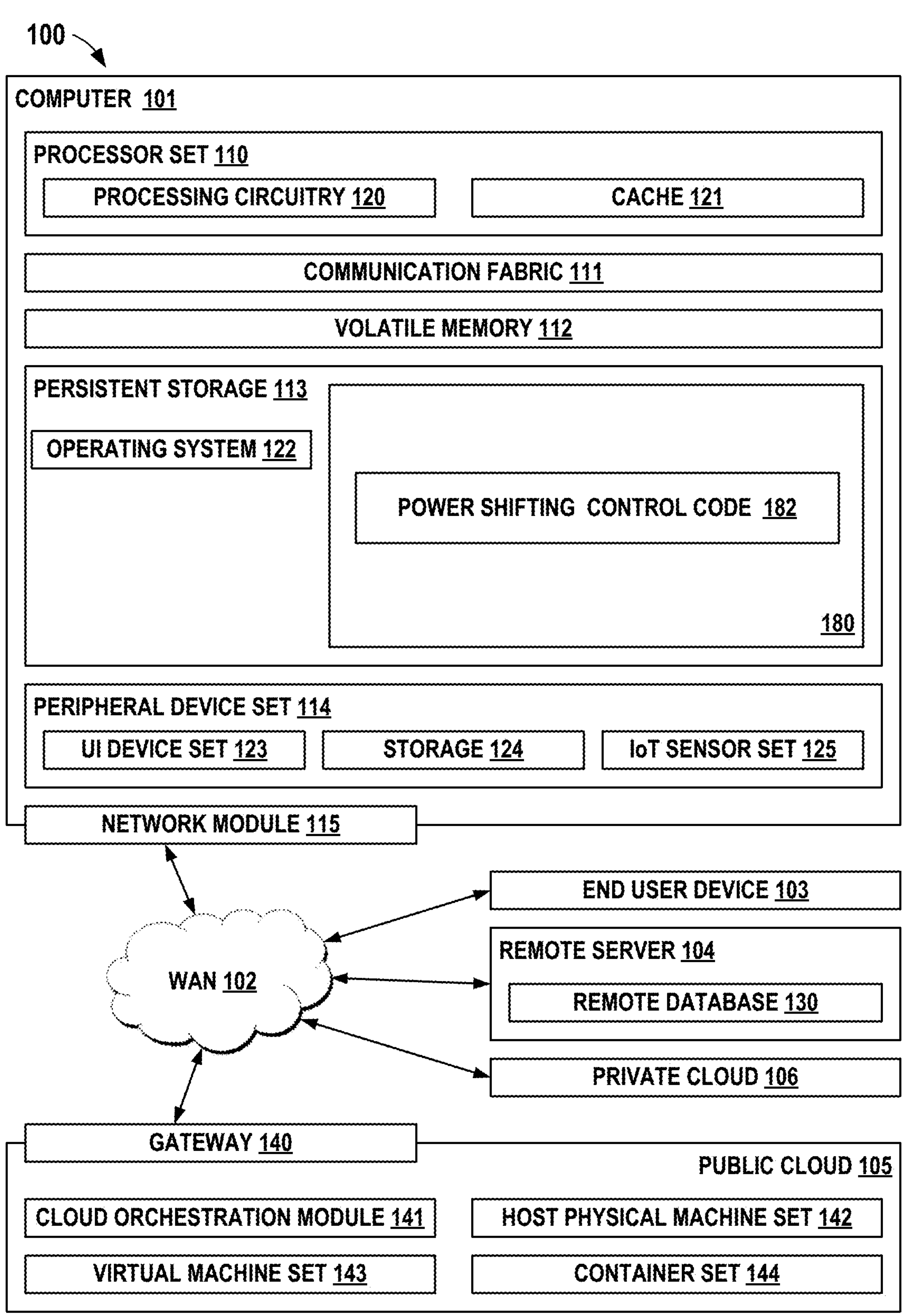
FIG. 1 is a block diagram of an example computer environment for use in conjunction with one or more disclosed embodiments for implementing intelligent power shifting in an uninterruptable power supply (UPS) system.

Disclosed embodiments provide methods, systems, and computer program products for implementing intelligent power shifting in an uninterruptable power supply (UPS) system that includes a redundant Power Distribution Units (PDU) pair. Disclosed embodiments automatically detect a UPS that is being used for a load, and in the presence of the main power signal provide intelligent power shifting of a predefined amount of the main power signal to power supply units (PSUs) that are not powered by the UPS, reducing the UPS power consumption to provide enhanced system efficiency.

According to an aspect of disclosed embodiments, a non-limiting computer implemented method is provided. The method comprises providing an uninterruptable power supply (UPS) to use for a load; determining a first subset of power supply units (PSUs) that are coupled to a first Power Distribution Unit (PDU) powered through the UPS and a second subset of PSUs that are coupled to a second PDU not powered through the UPS; and conditioned upon a presence of a main power signal, shifting a predefined amount of the main power signal to the second subset of PSUs coupled to the second PDU not powered by the UPS. The method enables effective and efficient intelligent power shifting in a UPS system to provide enhanced system efficiency, with saving on total power due to the reduces power consumption by the UPS.

According to an aspect of disclosed embodiments, a system is provided. The system includes one or more computer processors, and a memory containing a program which when executed by the one or more computer processors performs an operation. The operation comprises providing an uninterruptable power supply (UPS) to use for a load; determining a first subset of power supply units (PSUs) that are coupled to a first Power Distribution Unit (PDU) powered through the UPS and a second subset of PSUs that are coupled to a second PDU not powered through the UPS; and conditioned upon a presence of a main power signal, shifting a predefined amount of the main power signal to the second subset of PSUs coupled to the second PDU not powered by the UPS. The system enables effective and efficient intelligent power shifting in a UPS system to provide enhanced system efficiency, with saving on total power due to the reduces power consumption by the UPS.

According an aspect of disclosed embodiments, a computer program product is provided. The computer program product includes a computer-readable storage medium having computer-readable program code embodied therewith, the computer-readable program code executable by one or more computer processors to perform an operation. The operation comprises providing an uninterruptable power supply (UPS) to use for a load; determining a first subset of power supply units (PSUs) that are coupled to a first Power Distribution Unit (PDU) powered through the UPS and a second subset of PSUs that are coupled to a second PDU not powered through the UPS; and conditioned upon a presence of a main power signal, shifting a predefined amount of the main power signal to the second subset of PSUs coupled to the second PDU not powered by the UPS. The computer program product enables effective and efficient intelligent power shifting in a UPS system to provide enhanced system efficiency, with saving on total power due to the reduces power consumption by the UPS.

An embodiment of the present disclosure further includes conditioned upon an absence or a disruption of the main power signal, the second subset of PSUs are automatically powered through the second PDU by the UPS. The embodiment enables efficiently UPS system operation in the event of an absence or a disruption of the main power signal.

Additionally, an embodiment of the present disclosure where providing the uninterruptable power supply (UPS) further comprises monitoring at least one of a magnitude, frequency, phase, and shape of one or more one system input signals; and comparing a measured signal to a main power signal. The embodiment enables effective and efficient intelligent power shifting in the UPS system to provide enhanced system efficiency.

Additionally, an embodiment of the present disclosure where providing the UPS further comprises configuring a UPS detector for monitoring one or more one system signals from the first PDU and the second PDU. The embodiment enables efficiently detecting the UPS and enables effective and efficient intelligent power shifting in the UPS system to provide enhanced system efficiency.

Additionally, an embodiment of the present disclosure where determining the first subset of PSUs and the second subset of PSUs further comprises measuring current using respective current sensors coupled to output ports of the first PDU and output ports of the second PDU to identify a respective redundant power path through the first subset of PSUs and through the second subset of PSUs not powered through the UPS. The embodiment enables efficiently implementing intelligent power shifting in the UPS system to provide enhanced system efficiency.

Additionally, an embodiment of the present disclosure where shifting a predefined amount of the main power signal to the second subset of PSUs coupled to the second PDU not powered by the UPS further comprises shifting a selected percentage value of the main power signal to the second subset of PSUs, wherein the selected percentage value is provided in a range between 60% and 100% of the main power signal. The embodiment providing enhanced system efficiency based on intelligent power shifting in the UPS system.

Additionally, an embodiment of the present disclosure where the selected percentage value is based on a minimum amount of the main power signal in the presence of the main power signal to enable at least one of: load powering operation by the UPS upon the absence or a disruption of the main power signal, or effective recovery by the UPS following the absence or the disruption of the main power signal. The embodiment enables efficiently implementing intelligent power shifting in the UPS system to provide enhanced system efficiency, while providing reliable utility power redundancy with the UPS.

Additionally, an embodiment of the present disclosure where conditioned upon a presence of a main power signal, shifting the predefined amount of the main power signal to the second subset of PSUs further comprises providing a voltage control signal to operatively control the second subset of PSUs for power shifting and incrementally adjust the voltage control signal for shifting the predefined amount. The embodiment enables efficiently implementing intelligent power shifting in the UPS system to provide enhanced system efficiency.

Additionally, an embodiment of the present disclosure where conditioned upon a presence of a main power signal, shifting the predefined amount of the main power signal to the second subset of PSUs further comprises providing a power shifting control module for applying and incrementally adjusting a voltage control signal to the second subset of PSUs for load shifting by the second subset of PSUs. The embodiment enables efficiently implementing intelligent power shifting in the UPS system to provide enhanced system efficiency.

Additionally, an embodiment of the present disclosure where shifting the predefined amount of the main power signal to the second subset of PSUs coupled to the second PDU not powered by the UPS decreases UPS power consumption during system operation in the presence of the main power signal, increasing system efficiency. The embodiment enables efficiently implementing intelligent power shifting in the UPS system to provide enhanced system efficiency.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as Power Shifting Control Code 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
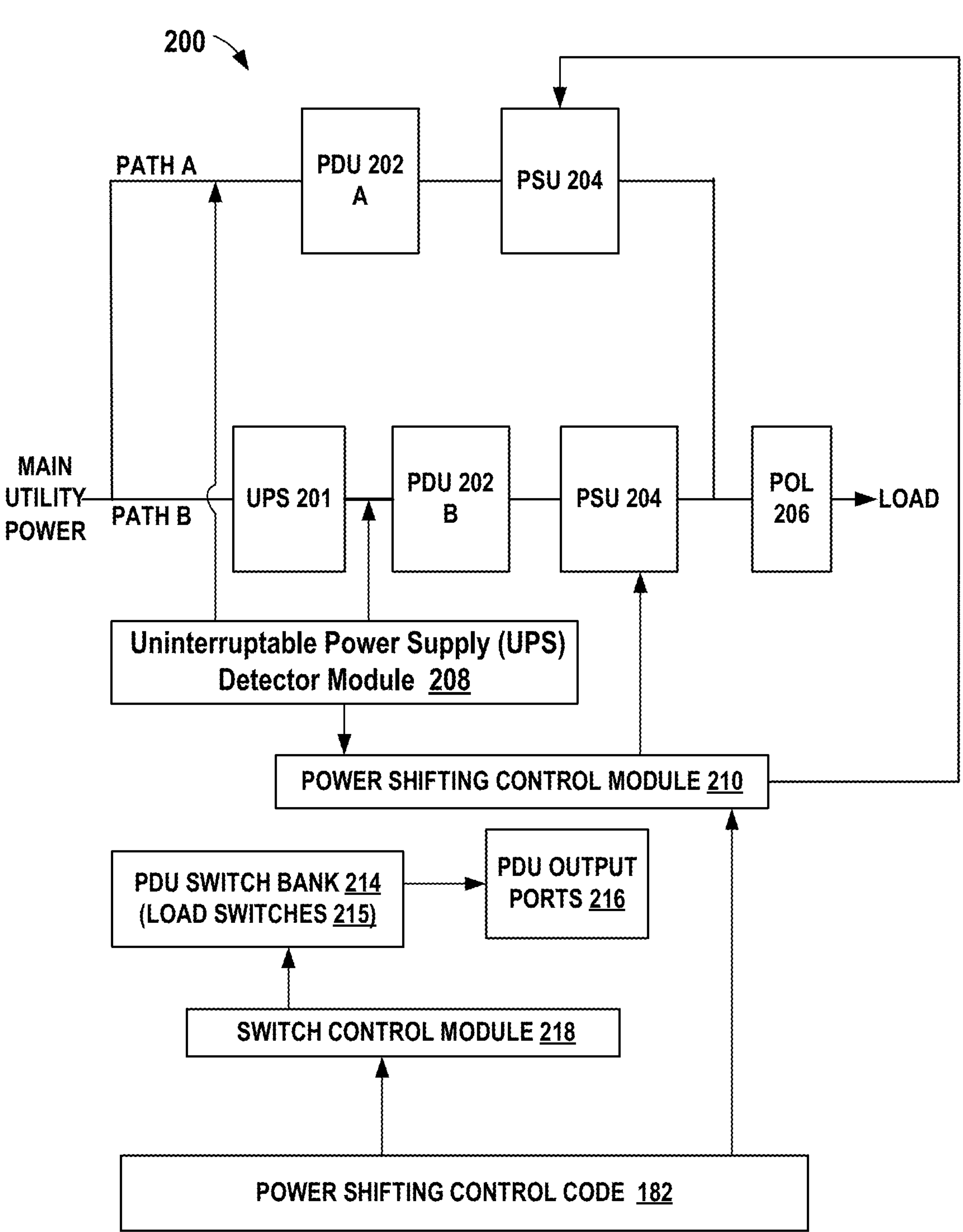
FIG. 2 is a schematic and block diagram of an example UPS system with PDU redundancy for implementing intelligent power shifting of one or more disclosed embodiments.

Referring to FIG. 2, there is shown an example system 200 with PDU redundancy for implementing intelligent power shifting of one or more disclosed embodiments. System 200 can be used in conjunction with the computer 101 and the computing environment 100 of FIG. 1 and the Power Shifting Control Code 182 for implementing inventive methods of disclosed embodiments.

As shown, system 200 includes an UPS 201 with a PDU redundant pair in accordance with a disclosed embodiment. System 200 includes a single utility power source input or main utility power and redundant power paths including a first Path A and a second path B, which run through a respective one of PDUs 202A, 202B of the PDU redundant pair. The PDUs 202A, 202B are used to distribute power through associated PSUs 204 to a Point of Load (POL) Regulator 206 of the Load, including respective attached electrical components, such as processors, memory, input/output (I/O), and the like. The UPS 201 is used to add utility redundancy in the event of a disruption or loss of the main utility power through the PDU 202B to the PSUs 204. System 200 includes multiple PDUs 202 (e.g., used in a datacenter that has PDU redundancy, where loads are coupled to redundant PDUs). For example, the PDUs 202 receive three-phase power inputs and support Delta and Wye input power configurations in accordance with a disclosed embodiment. PDUs 202 may provide single phase power at PDU output ports coupled to PSUs 204.

System 200 includes a UPS Detector Module 208 for automatically determining whether a UPS is being used for a load, and providing sensed signal data to a power shifting control module 210, and optionally send and receive sensed signal data and telemetry data used in conjunction with the computer 101 in the computing environment 100. The UPS Detector Module 208 either receives user input to which path contains the UPS 201 or automatically determines which path contains a UPS 201 by monitoring the inputs to both PDUs 202A, 202B. In a disclosed embodiment, the UPS Detector Module 208 measures at least one of a magnitude, frequency, phase, and shape of a PDU input signal and compares the measured signal to a main power signal to detect a UPS being used with a load in system 200, such as the UPS 201. The UPS Detector Module 208 can monitor multiple inputs through a system microcode of the Power Shifting Control Code 182 to determine if a UPS is being used in system 200, based on measurable differences between the main utility signal and one or more input signals, such as signal magnitude, frequency, phase, not true sinusoid, and the like. The power shifting control module 210 determines which system PSUs 204 are coupled to (e.g., plugged into PDU output ports or receptacles) the PDUs 202A that are not powered through the UPS 201 in Path A. The power shifting control module 210 determines which system PSUs 204 are coupled to (e.g., plugged into PDU output ports or receptacles) the PDUs 202B that are powered through the UPS 201 in Path B.

System 200 implements intelligent power shifting, in the presence of the main power signal, to shift significantly more load current of the main power signal to the PSUs 204 in Path A, which are coupled to the PDUs 202A that are not powered through the UPS 201. System 200 implements power shifting through an intelligent algorithm that controls the current through the PSUs, to increase the net system efficiency to nearly the Path A efficiency, while still having the redundant Path B in place in the event of a power outage. In a disclosed embodiment, in the event of a loss of the main utility power, system 200 runs in N-mode through the PDUs 202B connected with the UPS 201 (e.g., 100% of the power will switch to the UPS Path B where PDUs 202A drop out with input power loss). In a disclosed embodiment, the UPS 201 can enable uninterrupted operation in the event of the main utility power loss or disruption, while system 200 saves significant power by intelligent power shifting when the main utility power is available, which is the majority of the time. In some situations, a small amount of current remains in Path B when the main utility power is available to ensure quick recovery during a utility outage and for faster recovery following the power absence or disruption; however, this does depend on the duration of system hold-up capacitance residing in the PSU 204.

In one embodiment, each of the PDUs 202A, 202B includes a PDU switch bank 214 including an array of output load switches 215 selectively connecting one of the power input lines or phases Phase A, Phase B, and Phase C to a respective one of the PDU output power ports 216 of the PDUS 202A, 202B. As shown, system 200 includes a switch control module 218 operatively controlling the plurality of output load switches 215 of the PDUS 202A, 202B.

In a disclosed embodiment, intelligent power shifting is enabled based on algorithms that detect an upstream UPS of the redundant PDUs 202 B as shown in FIG. 2. For example, in an initial system configuration, power distribution typically includes a 50/50 current split between Paths A and B, which may provide an example net efficiency of about 82.5% with the UPS 201. Because UPS 201 has efficiency losses from AC/DC conversion, battery charging, and DC/AC conversion, and may have an example peak efficiency of approximately 95%, the path B has much lower efficiency than path A, such as with an example path A efficiency of 84.6%, an example path B efficiency is 80.4% or 4.2% less than path A efficiency with the net efficiency of about 82.5%. For example, based on intelligent power shifting of disclosed embodiment, an 80/20 current split between Paths A and B may provide an example net efficiency of about 83.5%. An intelligent power shifting of 90/10 current split between Paths A and B (when there is no failure in the main utility power) may provide an example net efficiency of about 84.0%, and a 100/0 current split may provide an example net efficiency of about 84.6%. In a disclosed embodiment, intelligent power shifting with the power shifting control module 210 may keep a small amount of current in Path B to ensure correct operation during a utility outage and for faster recovery of UPS 201; however, this does depend on the duration of system hold-up capacitance residing in the PSUs 204.

Figure 3:
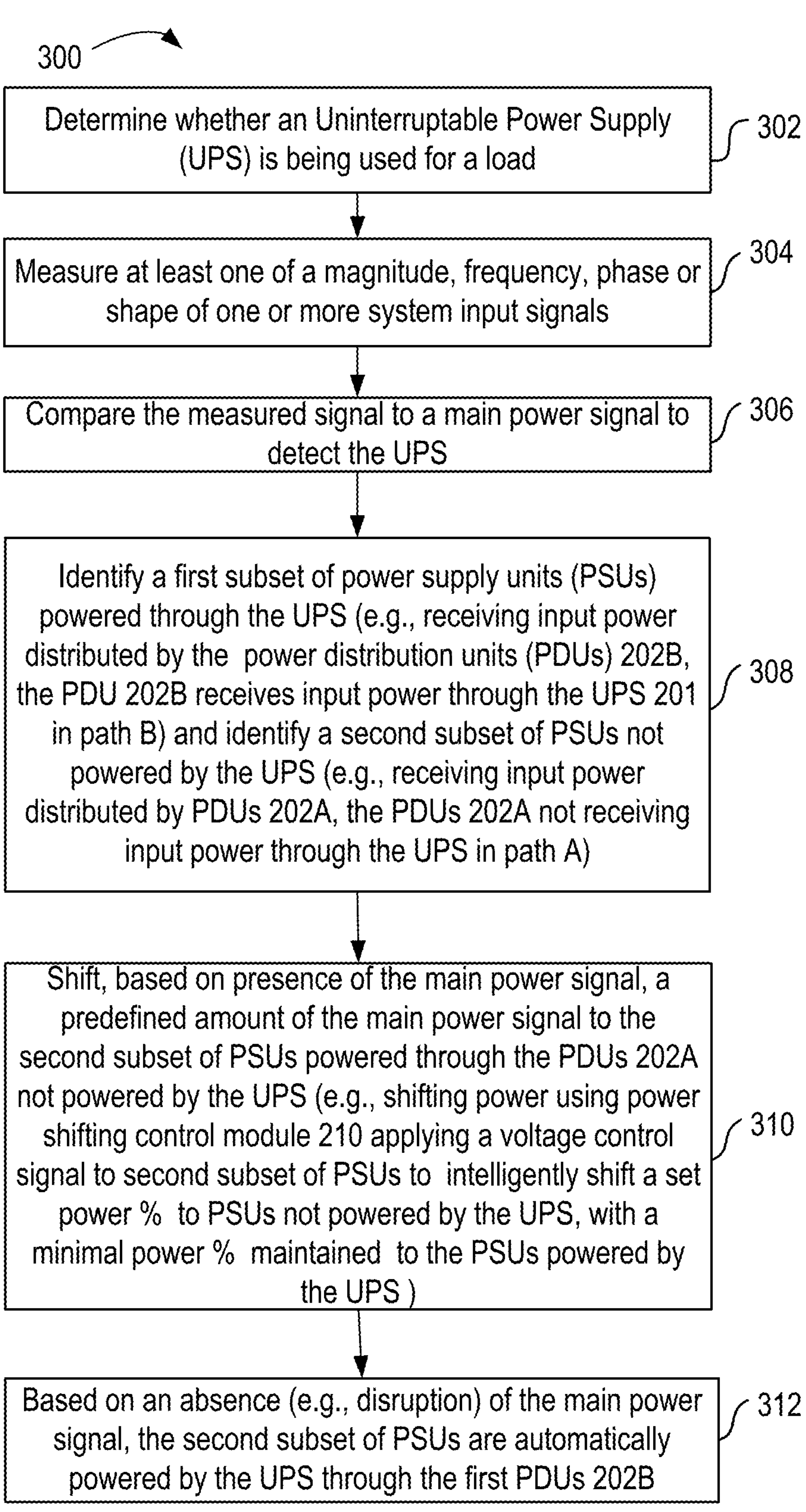
FIG. 3 is a flow chart illustrating example operations of a method for implementing intelligent power shifting of one or more disclosed embodiments.

FIG. 3 is a flow chart illustrating example operations of a method 300 for implementing intelligent power switching of one or more disclosed embodiments. The method 300 can be implemented by the system 200 in conjunction with the computer 101 of the computing environment 100 of FIG. 1 with the Power Shifting Control Code 182. Method 300 uses detection and intelligent algorithms to shift power away from input cables that run through a UPS 201, to avoid unnecessary UPS power conversion losses. In FIGS. 2, 3, 4, 5, and 6, the same reference numbers are used for the same or similar components.

At block 302, system 200 determines, by a UPS detector module 208, whether a UPS 201 is being used for a load. That is, the system determines whether a UPS is present. For example, the UPS detector module 208 automatically determines whether a UPS is being used for a load, and provides sensed signal data to the power shifting control module 210. The UPS detector module 208 can receive sensed signal data and telemetry data available with the computer 101 in the computing environment 100.

At block 304 for UPS detecting, system 200 measures at least one of a magnitude, frequency, phase, and shape of one or more system input signals, for example detected at PDUs 202 inputs or at PDU output ports 216. At block 306 for UPS detecting, system 200 compares the measured input signal characteristics and signal differences to the main power signal to detect UPS 201 being used with a system load. In a disclosed embodiment, the UPS detector module 208 can monitor multiple signals through a system microcode of the Power Shifting Control Code 182 to determine if a UPS is being used in system 200, based on measurable signal characteristics and signal differences between the main utility power signal and one or more input signals, such as signal magnitude, frequency, phase, not true sinusoid, and the like.

At block 308, system 200 identifies a first subset of PSUs powered through the UPS 201, and a second subset of PSUs not powered through the UPS 201. For example, using the UPS detector module 208 with the power shifting control module 210, system 200 determines which PSUs 204 are coupled or plugged into output ports or receptacles of the PDUs 202A that are not powered through the UPS 201 in Path A and which system PSUs 204 are coupled or plugged into output ports or receptacles of the PDUs 202B that are powered through the UPS in Path B.

At block 310, system 200 implements intelligent power shifting, in the presence of the main power signal (e.g., there is no disruption or failure in the main power signal), to shift significantly more load current of the main power signal to the PSUs 204 in Path A, which are coupled to the PDUs 202A that are not powered through the UPS. System 200 implements power shifting through an intelligent algorithm that controls the current through the PSUs, to increase the net system efficiency to nearly the Path A efficiency by reducing power consumption of the UPS 201, while having the redundant path B in place in the event of a power outage.

At block 312, system 200, based on an absence (e.g., disruption or failure) of the main power signal, the second subset of PSUs are automatically powered by the UPS 201, through the PDU 202B. In a disclosed embodiment, in the event of a loss of the main utility power, system 200 runs in N-mode through the PDUs 202B connected with the UPS 201 (e.g., 100% of the power provided to the UPS Path B where the PDUs 202A drop out with input power loss). Significant power is saved when the main utility power is available by the intelligent power shifting of disclosed embodiments providing enhanced system efficiency, which is the majority of the time. System 200 typically maintains a small amount of current remaining in Path B when the main utility power is available in order to ensure quick UPS operation during a utility outage and faster recovery following the power absence or disruption; however, the minimum power maintained in Path B does depend on the duration of system hold-up capacitance residing in PSUs 204.

Figure 4:
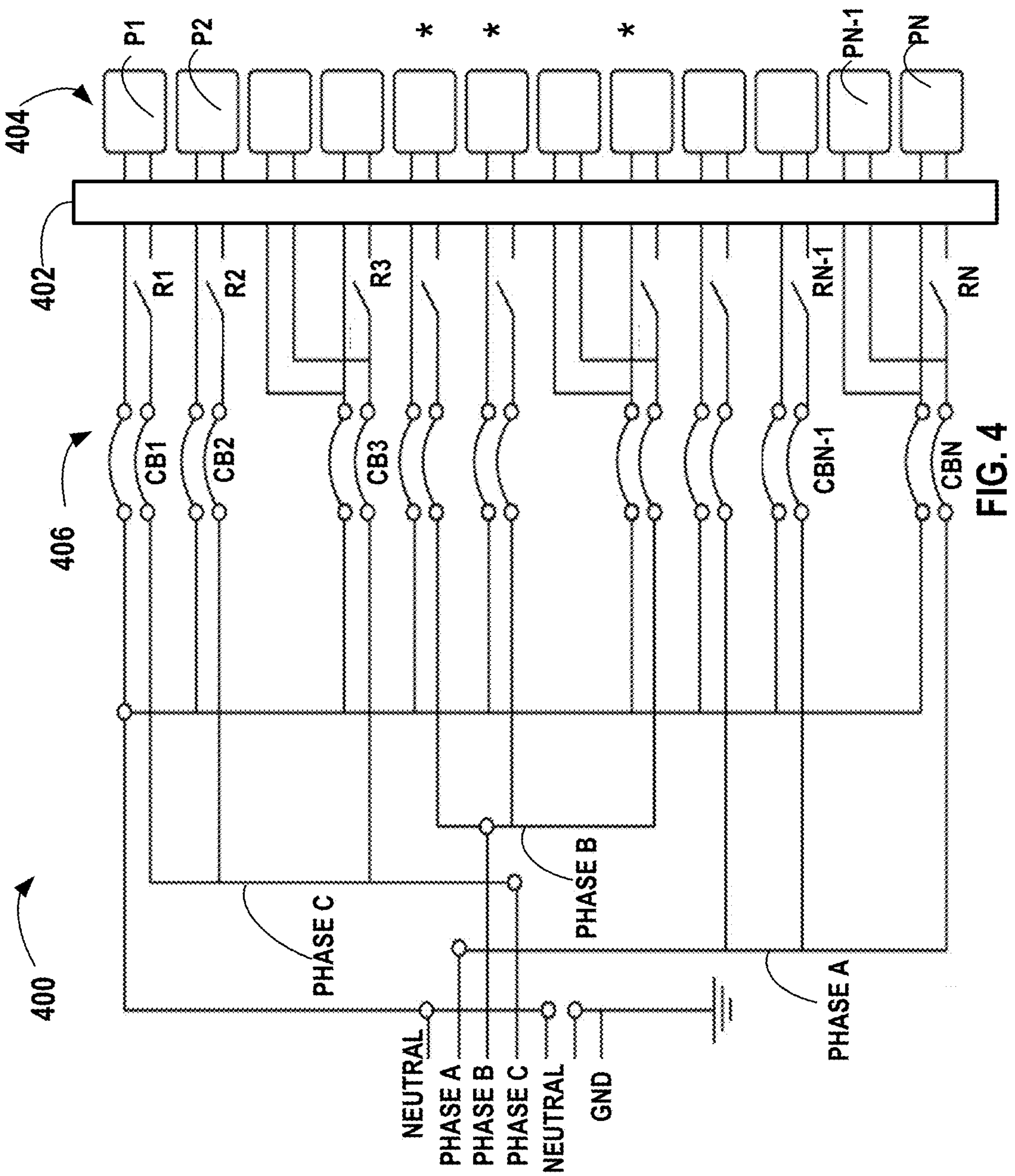
FIG. 4 is a schematic and block diagram of an example PDU including a switch bank of output load switches for a Wye-configuration input of one or more disclosed embodiments.

FIG. 4 illustrates a PDU 400 of Wye-configuration input for the PDUs 202A, 202B and switch bank 214 of FIG. 2. As shown, PDU 400 includes a switch bank 402 of an array of output load switches, such as load switches 215 of the switch bank 214 in FIG. 2, coupled to each of the respective PDU output ports 404 P1-PN of a disclosed embodiment. The power inputs Phase A, Phase B, and Phase C are coupled to the switch bank 402 by a respective ones of series-connected circuit breaker (CB) and relay (R) 406, CB1-CBN and R1-RN with Neutral coupled to the switch bank 402 by the respective circuit breakers CB1-CBN. The array of output load switches of the switch bank 402 provide respective ones of Phase A, Phase B, and Phase C to the PDU output ports 404, P1-PN.

Figure 5:
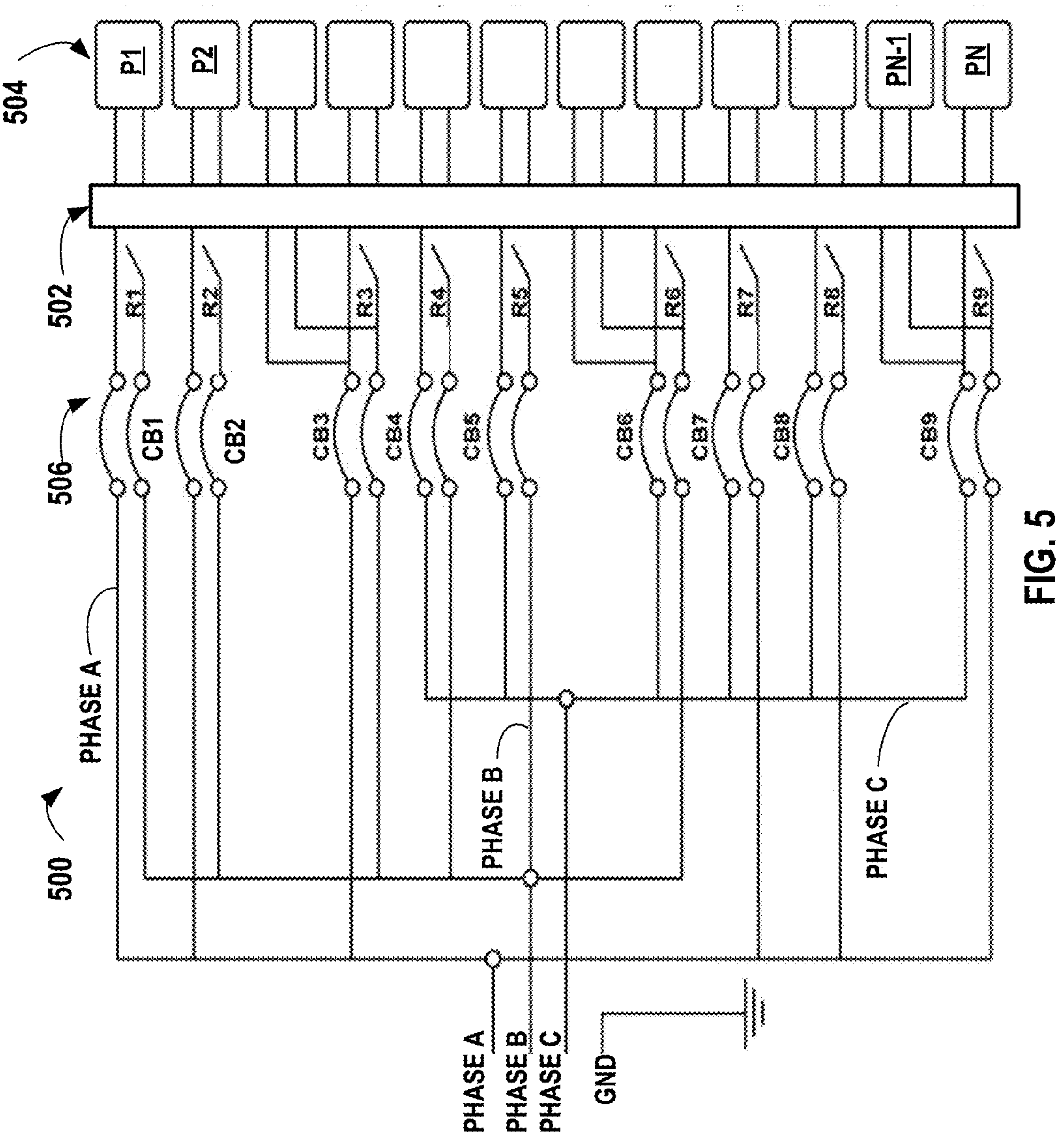
FIG. 5 is a schematic and block diagram of an example PDU including a switch bank of output load switches for a Delta-configuration input of one or more disclosed embodiments.

FIG. 5 illustrates an example PDU 500 for a Delta-configuration input, (e.g., the Neutral input is not used) including a switch bank 502 of an array of output load switches. For example, the switch bank 502 provides input Phase lines A, B, Phase lines B, C, or Phase lines C, A coupled to respective ones of the PDU output ports 504 P1-PN. PDU 500 is configured to automatically connect to the input voltage of the Delta-configuration with two Phase lines of inputs Phase A, Phase B, and Phase C coupled to respective PDU output ports. The power inputs Phase A, Phase B, and Phase C are coupled to the switch bank 502 by a respective ones of series-connected circuit breaker (CB) and relay (R) 506, CB1-CB9 and R1-R9. Nine circuit breakers and relays are shown for illustrative purposes only. Any number of circuit breakers and relays could be used depending upon the number of output ports used.

Figure 6:
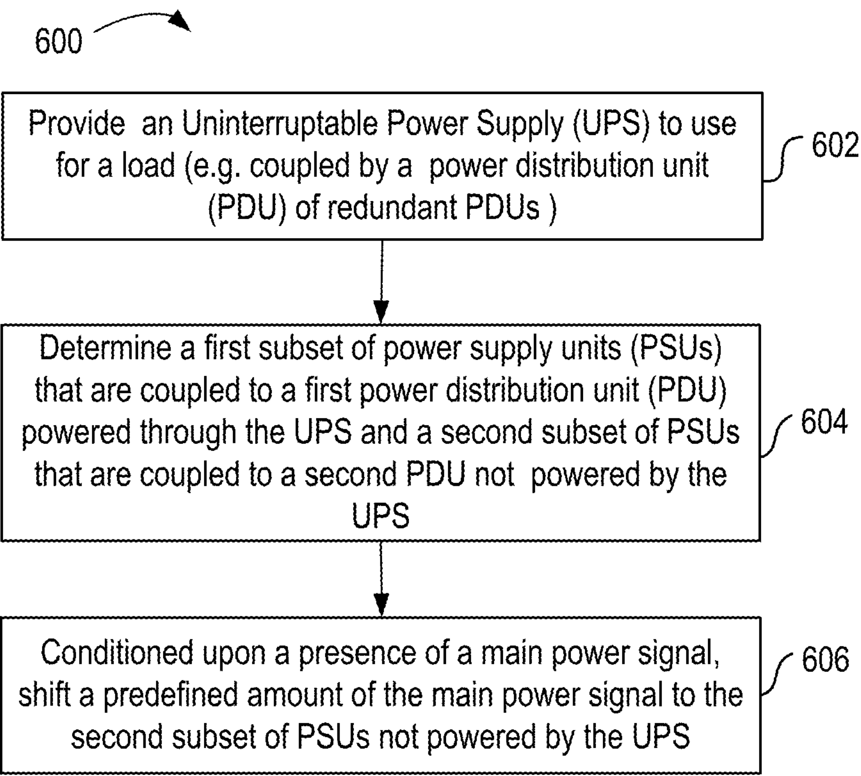
FIG. 6 is a flow chart of example operations of a method for implementing intelligent power shifting in a UPS system for enhanced system efficiency of a disclosed embodiment.

FIG. 6 illustrates a method 600 for implementing intelligent power shifting in a UPS system to provide enhanced system efficiency of a disclosed embodiment. Method 600 illustrates features and operations of method 300 of disclosed embodiments. The method 600 can be implemented by the system 200 in conjunction with the computer 101 of the cloud environment 100 of FIG. 1 with the Power Shifting Control Code 182.

At block 602, an UPS is provided to use for a load. For example, the UPS detector module 208 automatically determines whether a UPS is being used for a load; the UPS detector module 208 measures at least one of a magnitude, frequency, phase, and shape of one or more system input signal and compares the measured input signal to the main power signal to detect the UPS 201 being used with a system load. In a disclosed embodiment, the UPS detector module 208 can monitor multiple inputs through a system microcode of the Power Shifting Control Code 182 to detect that a UPS is being used based on measurable signal characteristics and differences between the main utility power signal and the sensed input signals, such as one or more of signal magnitude, frequency, phase, not true sinusoid.

At block 604, a first subset of PSUs that are coupled to a first PDU powered through the UPS and a second subset of PSUs that are coupled to a second PDU not powered through the UPS are determined. For example, the power shifting control module 210 determines which system PSUs 204 are coupled to the PDUs 202B that are powered through the UPS 201 in Path B, and which system PSUs 204 are coupled to the PDUs 202A that are not powered through the UPS 201 in Path A.

At block 606, conditioned upon a presence of a main power signal, a predefined amount of the main power signal is shifted to the second subset of PSUs coupled to the second PDU not powered by the UPS. In disclosed embodiments, intelligent power shifting is implemented in the presence of the main power signal, to shift significantly more load current of the main power signal to the PSUs 204 in Path A, which are coupled to the PDUs 202A that are not powered through the UPS. In disclosed embodiments, intelligent power shifting is implemented through an intelligent algorithm that controls the current through the PSUs, to increase the net system efficiency to nearly the Path A efficiency by reducing power consumption of the UPS 201, while having the redundant path B in place in the event of a power outage.

While the foregoing is directed to embodiments of the present invention, other and further embodiments of the invention may be devised without departing from the basic scope thereof, and the scope thereof is determined by the claims that follow.

What is claimed is:

1. A method comprising:

providing an uninterruptable power supply (UPS) to use for a load;

determining a first subset of power supply units (PSUs) that are coupled to a first Power Distribution Unit (PDU) powered through the UPS, and a second subset of PSUs that are coupled to a second PDU not powered through the UPS; and conditioned upon a presence of a main power signal, shifting a predefined amount of the main power signal to the second subset of PSUs by providing a voltage control signal to operatively control the second subset of PSUs for power shifting and incrementally adjusting the voltage control signal for shifting the predefined amount.

2. The method of claim 1, further comprising:

conditioned upon an absence or a disruption of the main power signal, the second subset of PSUs are automatically powered through the second PDU by the UPS.

3. The method of claim 1, wherein providing an uninterruptable power supply (UPS) further comprises monitoring at least one of a magnitude, frequency, phase, and shape of one or more one system input signals; and comparing a measured signal to the main power signal.

4. The method of claim 3, further comprises configuring a UPS detector for monitoring one or more one system signals from the first PDU and the second PDU.

5. The method of claim 1, wherein determining the first subset of PSUs and the second subset of PSUs further comprises measuring current using respective current sensors coupled to output ports of the first PDU and output ports of the second PDU to identify a respective redundant power path through the first subset of PSUs and through the second subset of PSUs not powered through the UPS.

6. The method of claim 1, wherein shifting the predefined amount of the main power signal to the second subset of PSUs coupled to the second PDU not powered by the UPS further comprises shifting a selected percentage value of the main power signal to the second subset of PSUs, wherein the selected percentage value is provided in a range between 60% and 100% of the main power signal.

7. The method of claim 6, wherein the selected percentage value is based on a minimum amount of the main power signal in the presence of the main power signal to enable at least one of: load powering operation by the UPS upon an absence or a disruption of the main power signal, or recovery by the UPS following an absence or a disruption of the main power signal.

8. The method of claim 1, wherein conditioned upon the presence of the main power signal, shifting the predefined amount of the main power signal to the second subset of PSUs further comprises providing a power shifting control module for applying and incrementally adjusting the voltage control signal to the second subset of PSUs for load shifting by the second subset of PSUs.

9. The method of claim 1, wherein shifting the predefined amount of the main power signal to the second subset of PSUs coupled to the second PDU not powered by the UPS decreases UPS power consumption during system operation in the presence of the main power signal, increasing system efficiency.

10. A system, comprising one or more computer processors; and a memory containing a program which when executed by the one or more computer processors performs an operation, the operation comprising:

providing an uninterruptable power supply (UPS) to use for a load;

determining a first subset of power supply units (PSUs) that are coupled to a first Power Distribution Unit (PDU) powered through the UPS, and a second subset of PSUs that are coupled to a second PDU not powered through the UPS; and conditioned upon a presence of a main power signal, shifting a predefined amount of the main power signal to the second subset of PSUs by providing a voltage control signal to operatively control the second subset of PSUs for power shifting and incrementally adjusting the voltage control signal for shifting the predefined amount.

11. The system of claim 10, further comprising:

conditioned upon an absence or a disruption of the main power signal, the second subset of PSUs are automatically powered through the second PDU by the UPS.

12. The system of claim 10, wherein providing an uninterruptable power supply (UPS) further comprises monitoring at least one of a magnitude, frequency, phase, and shape of one or more one system input signals; and comparing a measured signal to the main power signal.

13. The system of claim 10, wherein shifting the predefined amount of the main power signal to the second subset of PSUs coupled to the second PDU not powered by the UPS further comprises shifting a selected percentage value of the main power signal to the second subset of PSUs, wherein the selected percentage value is provided in a range between 60% and 100% of the main power signal.

14. A computer program product comprising a computer-readable storage medium having computer-readable program code embodied therewith, the computer-readable program code executable by one or more computer processors to perform an operation comprising:

providing an uninterruptable power supply (UPS) to use for a load;

determining a first subset of power supply units (PSUs) that are coupled to a first Power Distribution Unit (PDU) powered through the UPS, and a second subset of PSUs that are coupled to a second PDU not powered through the UPS; and conditioned upon a presence of a main power signal, shifting a predefined amount of the main power signal to the second subset of PSUs by providing a voltage control signal to operatively control the second subset of PSUs for power shifting and incrementally adjusting the voltage control signal for shifting the predefined amount.

15. The computer program product of claim 14, further comprising:

conditioned upon an absence or a disruption of the main power signal, the second subset of PSUs are automatically powered through the second PDU by the UPS.

16. The computer program product of claim 14, wherein providing an uninterruptable power supply (UPS) further comprises monitoring at least one of a magnitude, frequency, phase, and shape of one or more one system input signals; and comparing a measured signal to the main power signal.

17. The computer program product of claim 14, wherein shifting the predefined amount of the main power signal to the second subset of PSUs coupled to the second PDU not powered by the UPS further comprises shifting a selected percentage value of the main power signal to the second subset of PSUs, wherein the selected percentage value is provided in a range between 60% and 100% of the main power signal.

* * * * *